United States Patent
Han et al.

(10) Patent No.: US 10,989,924 B2
(45) Date of Patent: Apr. 27, 2021

(54) HEAD-MOUNTED ELECTRONIC DEVICE

(71) Applicant: Samsung Electronics Co., Ltd., Gyeonggi-do (KR)

(72) Inventors: Kiwook Han, Gyeonggi-do (KR); Cheongsoo Park, Gyeonggi-do (KR); Seungnyun Kim, Gyeonggi-do (KR); Yongsang Yun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/284,406

(22) Filed: Feb. 25, 2019

(65) Prior Publication Data

US 2019/0265480 A1    Aug. 29, 2019

(30) Foreign Application Priority Data

Feb. 23, 2018   (KR) .......................... 10-2018-0022222

(51) Int. Cl.
   *G02B 27/01*    (2006.01)

(52) U.S. Cl.
   CPC ....... *G02B 27/0172* (2013.01); *G02B 27/017* (2013.01); *G02B 2027/013* (2013.01); *G02B 2027/0138* (2013.01)

(58) Field of Classification Search
   CPC .............. G02B 27/0172; G02B 27/017; G02B 2027/013; G02B 2027/0138
   See application file for complete search history.

(56) References Cited

U.S. PATENT DOCUMENTS

| | | | |
|---|---|---|---|
| 6,011,653 | A | 1/2000 | Karasawa |
| 6,040,945 | A | 3/2000 | Karasawa |
| 8,836,768 | B1 | 9/2014 | Rafii et al. |

(Continued)

FOREIGN PATENT DOCUMENTS

| | | |
|---|---|---|
| CN | 104898276 | 9/2015 |
| CN | 206497255 | 9/2017 |

(Continued)

OTHER PUBLICATIONS

International Search Report dated Jun. 20, 2019 issued in counterpart application No. PCT/KR2019/002185, 10 pages.

(Continued)

*Primary Examiner* — Kent W Chang
*Assistant Examiner* — Andrew Lee
(74) *Attorney, Agent, or Firm* — The Farrell Law Firm, P.C.

(57) ABSTRACT

An electronic device which may be put onto the head of a user is provided. The electronic device includes a housing including an upper surface, a lower surface including an opening, and a rear surface; a bracket including a first surface facing an open front portion of the housing, and a second surface extending rearward from the first surface and facing the opening, and interposed between the upper surface and the lower surface; a camera module disposed on the first surface of the bracket to face forward; and an image output module having at least a portion inserted into the opening, and including a light output member, a semi-transparent lens facing an eyeball of a user, and a light transmitting member optically connecting the light output member with the semi-transparent lens and including at least one of a lens or a mirror.

19 Claims, 10 Drawing Sheets

(56) References Cited

U.S. PATENT DOCUMENTS

| | | |
|---|---|---|
| 8,976,086 B2 | 3/2015 | Hilkes |
| 9,310,891 B2 | 4/2016 | Rafii et al. |
| 9,372,348 B2 | 6/2016 | Hilkes |
| 9,721,928 B1 | 8/2017 | Kalandar et al. |
| 10,510,137 B1* | 12/2019 | Kitain .................. G06T 3/40 |
| 2012/0120498 A1 | 5/2012 | Harrison et al. |
| 2012/0120499 A1 | 5/2012 | Harrison et al. |
| 2012/0123742 A1 | 5/2012 | Harrison et al. |
| 2012/0306725 A1 | 12/2012 | Hilkes |
| 2013/0120224 A1 | 5/2013 | Cajigas et al. |
| 2014/0132629 A1* | 5/2014 | Pandey ............... G06T 11/60 345/633 |
| 2015/0062003 A1 | 3/2015 | Rafii et al. |
| 2015/0084841 A1 | 3/2015 | Hilkes |
| 2016/0049720 A1* | 2/2016 | Hwang ............... H01Q 9/42 343/702 |
| 2016/0109712 A1 | 4/2016 | Harrison et al. |
| 2016/0117864 A1 | 4/2016 | Cajigas et al. |
| 2016/0209655 A1* | 7/2016 | Riccomini ......... G02B 27/0176 |
| 2016/0223818 A1 | 8/2016 | Tasaka et al. |
| 2016/0282628 A1 | 9/2016 | Hilkes |
| 2018/0098056 A1* | 4/2018 | Bohn ................. G09G 3/003 |
| 2018/0284512 A1* | 10/2018 | Lee .................... G06F 1/1643 |

FOREIGN PATENT DOCUMENTS

| | | |
|---|---|---|
| JP | 07-287185 | 10/1995 |
| JP | 2010056661 | 3/2010 |
| JP | 2016-145960 | 8/2016 |
| WO | WO 97/34182 | 9/1997 |
| WO | WO 2017/100074 | 6/2017 |

OTHER PUBLICATIONS

European Search Report dated Feb. 1, 2021 issued in counterpart application No. 19757171.4-1020, 12 pages.

* cited by examiner

HEAD-MOUNTED ELECTRONIC DEVICE

CROSS-REFERENCE TO RELATED APPLICATION(S)

This application is based on and claims priority under 35 U.S.C. § 119 to Korean Patent Application No. 10-2018-0022222, filed on Feb. 23, 2018, in the Korean Intellectual Property Office, the disclosure of which is incorporated herein by reference in its entirety.

BACKGROUND

1. Field

The present disclosure relates generally to a head-mounted electronic device, and more particularly, to an electronic device including a semi-transparent member, which is disposed under an image output module at a specified angle with respect to a direction of outputting an image.

2. Description of Related Art

Recently, various electronic devices, which are able to be directly put on a human body, have been developed. These electronic devices are generally called "wearable devices".

The wearable device put on a part of the human body may include, for example, a head-mounted display (HMD) put on the head of a user to display an image, smart-glasses, a smart watch (wristband), a contact lens-type device, a ring-type device, a shoe-type device, a clothing-type device, and a glove-type device, and may have various types attachable to a part of the human body or clothes. In particular, the HMD may be provided as goggles or glasses.

As the wearable device is directly put on the human body, the mobility and the accessibility of the user may be improved.

SUMMARY

The present disclosure has been made to address the above-mentioned problems and disadvantages, and to provide at least the advantages described below.

In accordance with an aspect of the present disclosure, an electronic device is that includes a housing including a first opening and a second opening, a bracket disposed inside the housing, a camera that obtains an image of an external object through the first opening and is disposed on a first surface of the bracket, an image output module that outputs an image to an outside through the second opening and is disposed on a second surface of the bracket, a circuit board electrically connected with the camera and the image output module and disposed on a third surface of the bracket, and a semi-transparent member disposed under the image output module, at a specified angle with respect to a direction of outputting the image such that the image is displayed for a user.

In accordance with an aspect of the present disclosure, an electronic device, which is put on the head of a user, includes a housing including an upper surface, a lower surface including an opening, and a rear surface, which is interposed between the upper surface and the lower surface facing the face of the user, and having a front portion which is open, a wearing member extending from opposite sides of the rear surface of the housing to surround at least a portion of the head of the user, a bracket including a first surface facing the open front portion of the housing, a second surface extending rearward from the first surface and facing the opening, and interposed between the upper surface and the lower surface, a camera module disposed on the first surface of the bracket to face forward, and an image output module having at least a portion inserted into the opening, and including a light output member, a semi-transparent lens facing an eyeball of a user, and a light transmitting member optically connecting the light output member with the semi-transparent lens and including at least one of a lens or a mirror, in which the camera module is disposed such that a first centerline of a field of view of a camera formed through the camera module is directed downward while facing a front-surface direction.

In accordance with an aspect of the present disclosure, an electronic device is provided that includes a housing including a head mounting unit, a camera included inside the housing and arranged to have a first field of view in a first optical axis direction, a lens positioned outside the housing and inclined within a specified range, and a light output device included inside the housing to output light to at least a portion of the lens.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
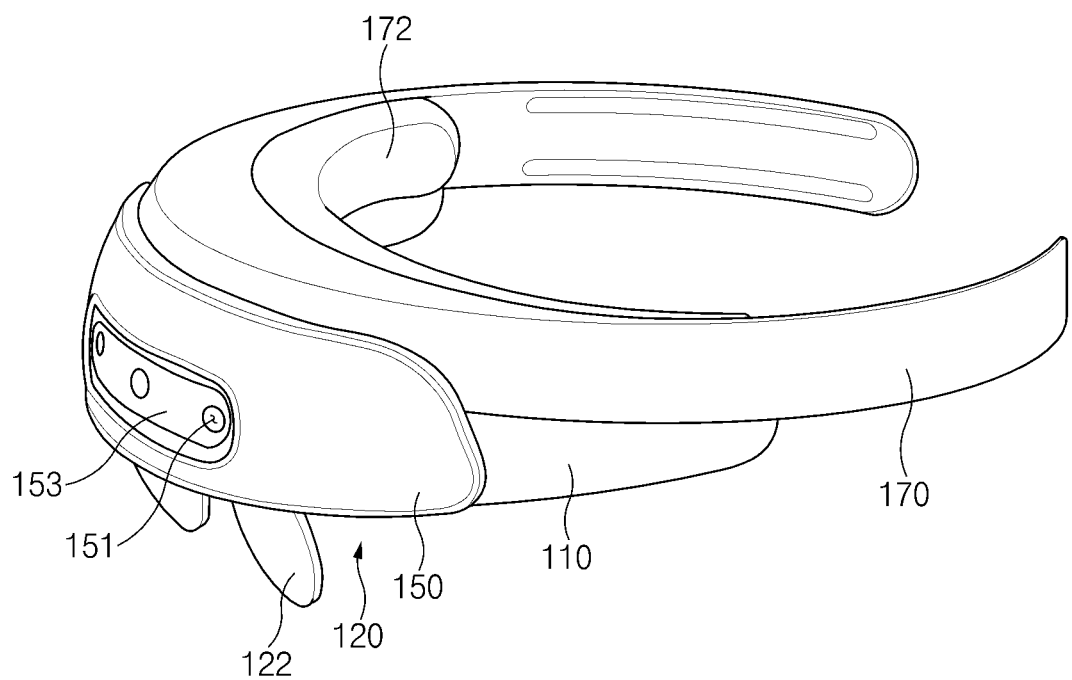
FIG. 1 is a perspective view of an electronic device, according to an embodiment.

Various embodiments of the present disclosure are described with reference to accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

An electronic device 100 may be mounted on the head of a user and provide at least one of a see-through function of augmenting reality or a see-closed function of providing a virtual reality.

For example, the see-through function may be a function of transmitting, to the eyeballs of the user, images of a real external object and a virtual target or object, which is output from an image output module, through the image output module or a transparent/semi-transparent lens to visually provide the objects to the user.

According to the see-through function, additional information and images of things actually viewed may be provided to a user.

The electronic device 100 may include a housing 110, a wearing member 170 extending rearward from the housing 110, a bracket provided inside the housing 110, a camera module 130 disposed inside the housing 110 and facing forward, an image output module 120 disposed at least partially inside the housing 110, as well as additional electrical elements.

FIG. 1 is a perspective view of the electronic device 100, according to an embodiment.

Referring to FIG. 1, the electronic device 100 includes the housing 110, a front cover 150 coupled to the front portion of the housing 110, the image output module 120 provided inside the housing 110, a semi-transparent member 122 exposed under the housing 110, and the wearing member 170 extending towards the rear portion of the housing 110.

The housing 110 may have a substrate, electronic parts for implementing various functions of the electronic device 100, the camera module 130, and the image output module 120 provided therein. The housing 110 may protect various electronic parts provided therein. The front cover 150 may be coupled to the front portion of the housing 110. The wearing member 170 extending rearward from opposite ends of the housing 110 may be coupled to the rear portion of the housing 110. The semi-transparent member 122 may be exposed under the housing 110.

The wearing member 170 may have a shape corresponding to the head of the user to surround at least a portion of the head of the user. The wearing member 170 may extend rearward from opposite ends of the housing 110. The wearing member 170 may be formed of a material having elasticity to be put on the heads of various users. Additionally, the wearing member 170 may include elastic straps.

The wearing member 170 may include a seating member 172 disposed on at least a portion of the forehead or the user's face. The seating member 172 may be formed on the inner side (i.e., the rear portion) of the wearing member 170 along the lengthwise direction of the wearing member 170. The seating member 172 may be formed of one or more cushion materials, such as a sponge or fabric, to provide a comfortable fit when in contact with the user's face. The seating member 172 may be detachably attached to the wearing member 170.

The front cover 150 may be coupled to the front portion of the housing 110, and may have one or more openings 151 formed therein. The camera module 130 in the housing 110 may be arranged while facing forward to take an image of an object or a target positioned in front of the camera module 130 through the opening of the front cover 150. The camera module 130 may be disposed at a specified angle with respect to the front direction.

The front cover 150 may have a camera area 153 surrounding the openings. The camera area 153 may be formed around one or more openings of the front cover 150. The camera area 153 may include a groove surrounding one or more openings.

The semi-transparent member 122 may be disposed to be exposed under the housing 110. The semi-transparent member 122 may be disposed to be facing the eyeballs of the user. The semi-transparent member 122 may be formed as an integrated module with the image output module 120, however the present disclosure is not limited thereto. For example, the semi-transparent member 122 may be coupled to the image output module 120 under the housing 110, while serving as a module separate from the image output module 120. Alternatively, the semi-transparent member 122 may be disposed under the image output module 120.

The semi-transparent member 122 may include a transparent and/or semi-transparent lens. The user may look ahead through the semi-transparent member 122. The user may view the content output by the image output module 120 through the semi-transparent member 122.

The visual information transmitted to the eyeball of the user may include visual information transmitted through the semi-transparent member 122 and visual information transmitted through reflection and/or refraction from the semi-transparent member 122. The visual information transmitted through the semi-transparent member 122 may be visual information related to the front of the user, and the visual information that is refracted and/or reflected by the semi-transparent member 122 may be displayed by the image output module 120.

Figure 2A:
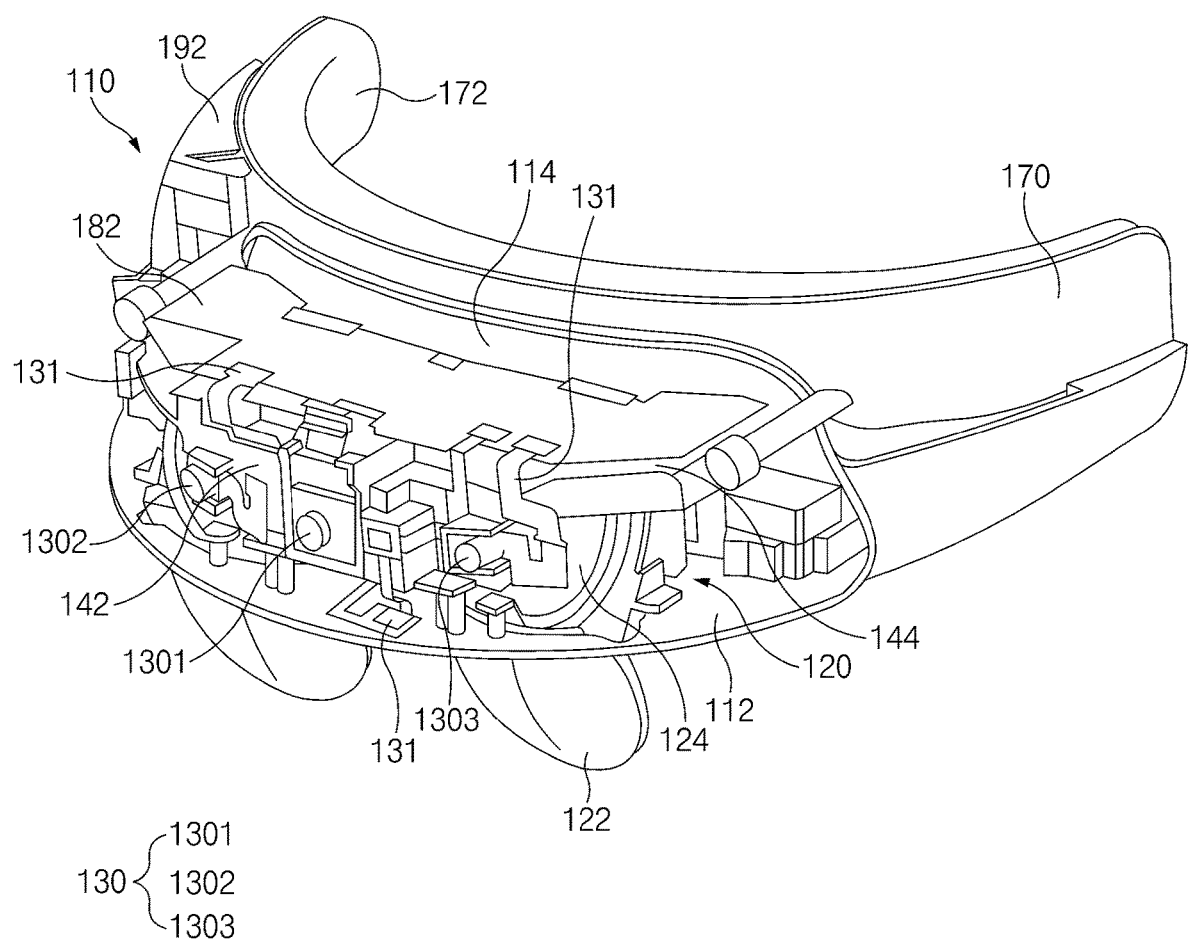
FIG. 2A is a view illustrating the inner part of a housing of the electronic device, according to an embodiment.
Figure 2B:
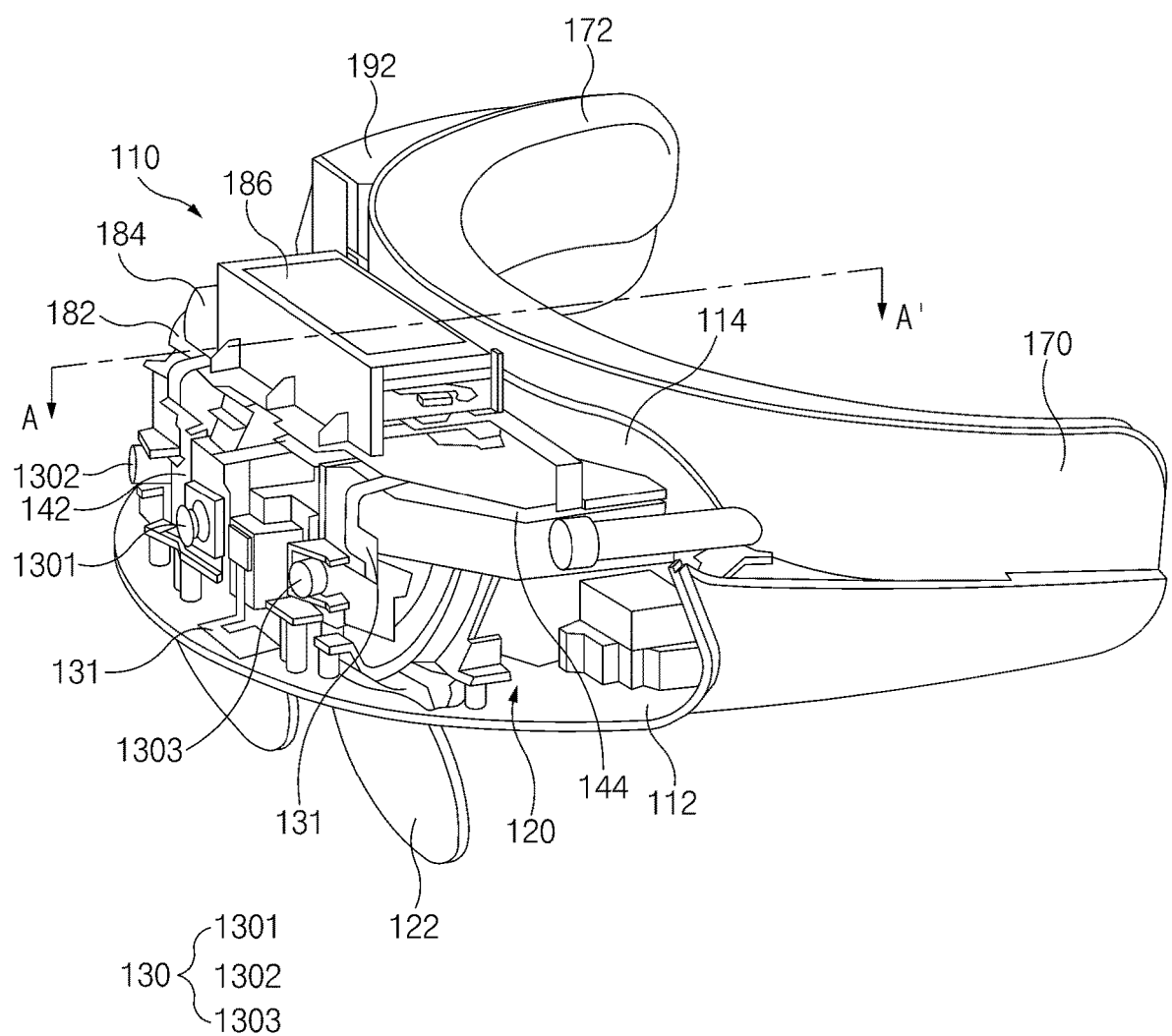
FIG. 2B is a view illustrating the inner part of the housing of the electronic device, according to an embodiment.
Figure 2C:
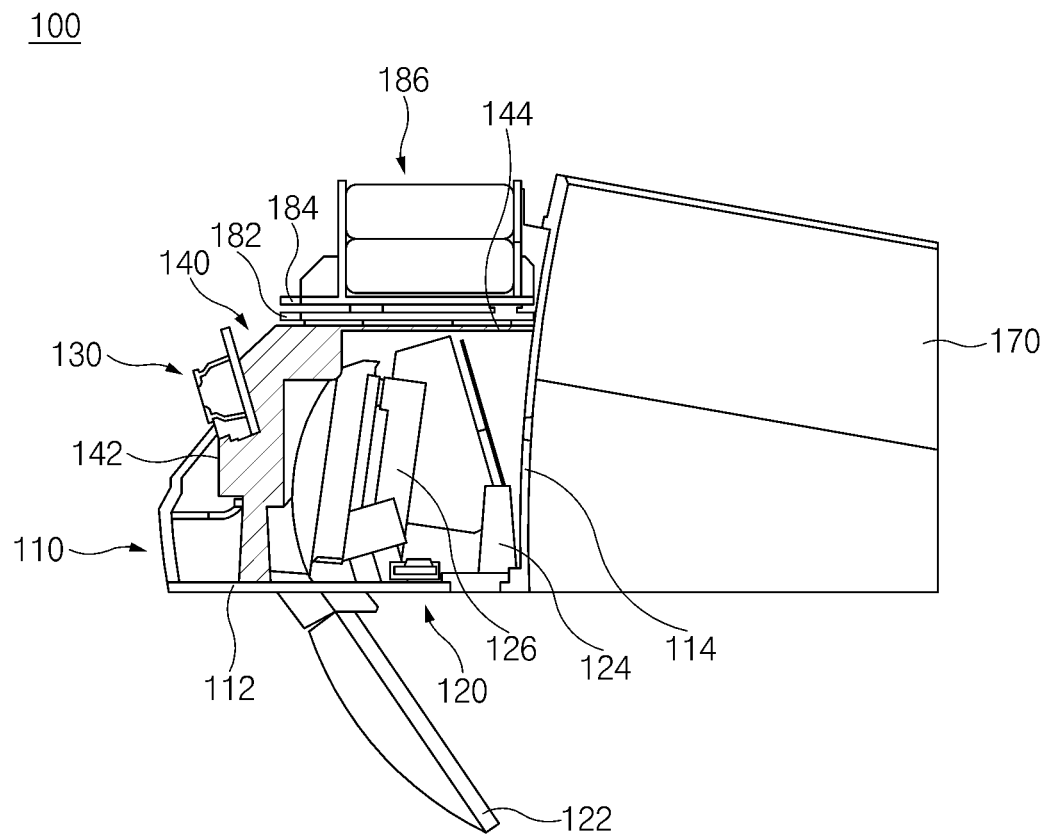
FIG. 2C is a cross-sectional view taken along line A-A' of FIG. 2B illustrating the housing of the electronic device, according to an embodiment.

FIG. 2A is a view illustrating the inner part of the housing 110 of the electronic device 100, according to an embodiment. FIG. 2B is a view illustrating the inner part of the housing 110 of the electronic device 100, according to an embodiment. FIG. 2C is a cross-sectional view taken along line A-A' of FIG. 2B illustrating the housing 110 of the electronic device 100, according to an embodiment.

Referring to FIGS. 2A to 2C, the housing 110 includes the bracket 140, the substrate, the camera module 130, and the image output module 120.

The housing 110 may have various shapes to include a plurality of electronic parts provided therein. The housing 110 may have a front portion and/or an upper portion that may be open. The front cover 150 described above may be coupled to the open front portion of the housing 110 or may be formed on a front surface of the housing 110.

The housing 110 is open at the front portion thereof and may include an upper surface, a lower surface 112, and a rear surface 114 formed between the upper surface and the lower surface 112. Alternatively, the housing 110 may include a front surface.

Referring to FIGS. 2A and 2B, the housing includes the lower surface 112 and the rear surface 114.

The housing 110 may have various shapes and may include an upper surface, a lower surface facing the upper surface, and a front surface and a rear surface interposed between the upper surface and the lower surface and connecting the upper surface with the lower surface. For example, an opening may be formed in one or more surfaces of the housing 110.

The housing may include a frame and a cover. Various electrical elements, parts, and modules (e.g., the camera module 130 or the image output module 120, etc.) provided inside the housing may be disposed in the frame or may be disposed on a bracket (e.g., see 140 of FIG. 2C) disposed on the frame. The cover (e.g., an upper cover 160 and/or a front cover 150 of FIG. 3) is coupled to the frame and may protect various electrical elements, parts, and modules disposed in the frame from an external impact.

Referring to FIG. 2C, the bracket 140 is disposed inside the housing 110. The bracket 140 may include a first surface 142 facing forward and a second surface 144 facing upward. The second surface 144 may extend rearward from the upper end of the first surface 142. The second surface 144 may extend from the upper end of the first surface 142 to the rear surface 114. The front end of the second surface 144 may be connected to the upper end of the first surface 142 and the rear end of the second surface 144 may be connected to the rear surface 114.

The first surface 142 may be disposed perpendicularly to the lower surface 112. The second surface 144 may be disposed in parallel to the lower surface 112. The first surface 142 and the second surface 144 may be connected perpendicularly to each other.

Referring to FIG. 2C, the bracket 140 may be in a substantially inversed L shape. Although the drawings illustrate that the lower surface 112 of the housing 110 and the first surface 142 of the bracket 140 are connected perpendicularly to each other, and the lower surface 112 of the housing 110 and the second surface 144 of the bracket 140 are connected to each other in parallel, this is provided for the illustrative purposes. That is, the bracket 140 and the housing 110 are not limited to the form, position, structure, or shape illustrated in the drawings.

The second surface 144 may be interposed between the lower surface 112 and the upper cover 160, the front end of the second surface 144 may be connected to the first surface 142, and the rear end of the second surface 144 may be connected to the rear surface 114. The second surface 144 of the bracket 140 has a shape corresponding to the rear surface 114, which may correspond to the front surface of the front cover 150 or the housing 110. The front portion of the second surface 144 of the bracket 140 may have a shape corresponding to the front portion of the lower surface 112.

The bracket 140 may be formed in a substantially inversed L shape. The camera module 130 may be disposed on the first surface 142 of the bracket 140. The substrate may be disposed on the second surface 144 of the bracket 140. The image output module 120 may be interposed between the first surface 142 of the bracket 140 and the rear surface 114 of the housing 110. The camera module 130 may include at least one camera device. Alternatively, the camera module 130 may include a plurality of camera modules 1301, 1302, and 1303. The plurality of camera modules 1301, 1302, and 1303 may be disposed on the first surface 142 of the bracket 140 to face forward. The plurality of camera modules 1301, 1302, and 1303 may be arranged at a specified angle with respect to the front-surface direction.

Referring to FIG. 2C, the image output module 120 may be disposed under the second surface 144 of the bracket 140. A portion of the image output module 120 may be interposed between the second surface 144 of the bracket 140 and the lower surface 112 of the housing 110. The remaining portion of the image output module 120 may be exposed under the lower surface 112 of the housing 110.

The image output module 120 may include a light output member 124, a light transmitting member 126, and a semi-transparent member 122. The light output member 124 may include a display device or a projector device. The light output member 124 may be positioned at a rear portion of the image output module 120 as illustrated in FIG. 2C. The light transmitting member 126 optically connects the light output member 124 and the semi-transparent member 122 positioned facing the eyeballs of the user, thereby transmitting light output from the light output member 124 to the semi-transparent member 122. The light output member 124 may include, for example, various light output devices that output light, such as a display or a projector.

Referring to FIG. 2C, the light transmitting member 126 may be disposed to face the light output member 124 and may include a mirror that reflects the light output from the light output member 124. However, the light transmitting member 126 illustrated in FIG. 2C is provided for illustrative purposes and may further include one or more mirrors and/or lenses.

The light transmitting member 126 may include at least one lens and/or mirror that reflects and/or refracts visual information output from the light output member 124 to the semi-transparent member 122.

The semi-transparent member 122 may be disposed at a position facing the eyeballs of the user when the user puts on the electronic device 100. The semi-transparent member 122 may be disposed under the lower surface 112 of the housing 110.

The semi-transparent member 122 may include a semi-transparent lens having a specified transmittance and a specified reflectance. As a level of the transmittance of the semi-transparent lens increases, an amount of external light transmitted to the eyeballs through the semi-transparent lens increases. As a level of reflectance of the semi-transparent lens increases, an amount of light of an image output from the light output member 124 and transmitted to the eyeballs of the user increases.

Referring to FIG. 2C, the image output module 120 is disposed in the internal space defined by the bracket 140, the rear surface 114, and the lower surface 112. The semi-transparent member 122 may be disposed under the internal space. As described above, the semi-transparent member 122 may be integrated with the image output module 120 or may be coupled to the image output module 120 and/or the housing 110 while serving as a separate component.

The electronic device 100 may include a connection unit 131 that electrically connects the camera module 130 or the image output module 120 with the substrate. The connection unit 131 may include various functional modules including an image processing module and/or a transmission/reception module and a conductive signal line for transmitting a signal. The conductive signal line may be made of a material including a metal. The conductive signal line may be disposed on the first surface 142 or the second surface 144 of the bracket 140.

The substrate may be disposed on the second surface 144 of the bracket 140. The substrate may include a first substrate 182 disposed on the second surface 144 and a second substrate 184 disposed on the first substrate 182. The substrate may be interposed between the second surface 144 of the bracket 140 and the upper cover 160. A battery 186 may be disposed on the second substrate 184. Alternatively, the battery 186 may be disposed on the side surface of the wearing member 170.

The battery 186 is disposed at an upper portion of the electronic device 100, and when the user puts on the electronic device 100, the battery 186 may be disposed at a position corresponding to the forehead of the user. When the battery 186 is disposed at the upper portion of the electronic device 100, the burden of the weight of the battery 186 may be reduced as compared to the case in which the battery 186 is disposed at the lower portion of the electronic device 100.

Figure 3:
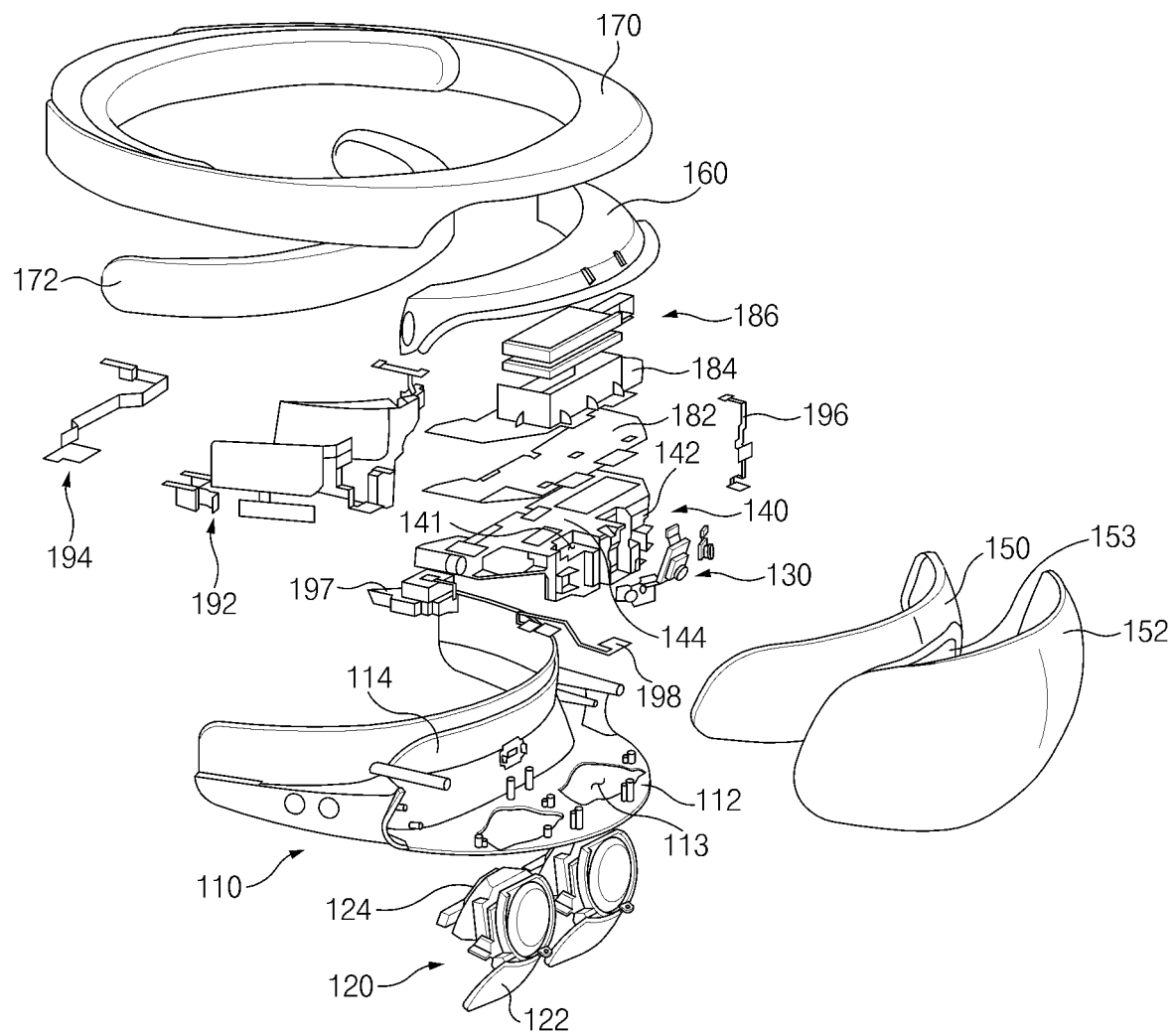
FIG. 3 is an exploded perspective view of the electronic device, according to an embodiment.

FIG. 3 is an exploded perspective view of the electronic device 100, according to an embodiment.

Referring to FIG. 3, a mounting groove 141 is formed in the first surface 142 of the bracket 140 such that the mounting of at least one camera module 130 may be provided. The mounting groove 141 may have a shape corresponding to the shape of the camera module 130. The first camera module 1301 may be disposed at the center of the first surface 142 and the second camera module 1302 and the third camera module 1303 may be disposed at opposite sides of the first camera module 1301.

The second surface 144 of the bracket 140 may have one or more openings. The whole weight of the bracket 140 and the electronic device 100 may be reduced and supported by the opening. One or more openings may be formed in the second surface 144 of the bracket 140, and a connection unit for electrical connection between other electrical parts may be positioned through the opening. The substrate and the battery 186 may be interposed between the second surface 144 of the bracket 140 and the upper cover 160.

One or more openings 113 may be formed in the lower surface 112 of the housing 110. At least a portion of the image output module 120 may be disposed in the opening 113. A portion of the image output module 120 may be disposed inside the housing 110. A portion of the image output module 120 may be interposed between the opening 113 and the second surface 144 of the bracket 140. The remaining portion of the image output module 120 may extend to the lower portion of the housing 110 from the inside of the housing 110 through the opening 113. At least a portion of the semi-transparent member 122 may be connected with the image output module 120 through the opening 113 and may be exposed under the housing 110.

The image output module 120 may be included in an integral module including the semi-transparent member 122 facing the eyeballs of the user. In this case, the semi-transparent member 122 may be disposed under the housing 110 through the opening 113 in the lower surface 112 of the housing 110.

One or more openings 113 may be formed in the lower surface 112 of the housing 110. The image (or light) generated from the image output module 120 may be transmitted to the semi-transparent member 122 positioned under the housing 110 through the opening 113.

The image (or light) output from the light output member 124 of the image output module 120 may be transmitted to the semi-transparent member 122 through at least one light transmitting member 126. As described above, the light transmitting member 126 may include one or more mirrors or lenses. The number, type or arrangement angle of the light transmitting members 126 may vary depending on an optical path inside the image output module 120.

One or more openings may be formed in the housing 110 or the upper cover 160 to discharge heat generated from the substrate and the battery 186. The heat may be easily discharged through the opening and the internal temperature of the housing 110 may be lowered to prevent the performance of the electronic device 100 from being deteriorated.

The front cover 150 may be coupled to the housing 110 in a physical manner such as a manner using a hook or a magnet, or in an electromagnet manner. Alternatively, the front cover 150 may be coupled to the housing 110 by an adhesive member provided between the front cover 150 and the housing 110. The front cover 150 may be a streamlined curved surface corresponding to that of the lower surface 112 of the housing 110.

The front cover 150 may have an opening 151 formed therein such that external light may reach the camera module 130. The front cover 150 may further include the camera module 130. The camera module 130 may be provided in the opening 151. At least one or more openings 151 may be formed to correspond to a number equal to the number of camera modules 130. The camera area 153 may be formed around the one or more openings 151 of the front cover 150. The camera area 153 may be provided in the form of a groove surrounding one or more openings 151. The opening 151 may be positioned inside the groove, thereby preventing the camera module 130 exposed through the opening 151 from being damaged.

The front cover 150 may further include a window 152 to constitute the surface of the electronic device 100. The window 152 may include a variety of materials, various patterns, and/or various colors to enhance the aesthetics of the electronic device 100. The window 152 may protect the camera module 130 exposed through the opening 151 of the front cover 150. External light may be transmitted to the camera lens of the camera module 130 through the window 152. The window 152 may block a portion of light incident from the outside.

The window 152 may include at least one of plastic, ceramic, or glass. The plastic may include polycarbonate and/or acrylic; and the ceramic may include glass, sapphire and/or transparent ceramics. The window 152 may include various materials and may have various transmittances. The output of the light output member 124 of the image output module 120 may be reduced by adjusting the transmittance of the window 152 to block a portion of light incident from the outside.

The window 152 may cover the surface of the front cover 150 in which the camera module 130 is disposed. Further, the window 152 may extend further downward from the surface of the front cover 150 and may be disposed in front of the semi-transparent member 122. The amount of external light incident to the semi-transparent member 122 may be adjusted depending on the transmittance of the window 152.

The window 152 may include a first area provided in front of the camera module 130 and a second area provided in front of the semi-transparent member 122. The first area may have a first transmittance and the second area may have a second transmittance different from the first transmittance. The first transmittance and the second transmittance may be adjusted such that the first area may adjust an amount of light incident to the camera module 130 and the second area may adjust an amount of light incident to the semi-transparent member 122.

The window 152 may be disposed in front of the semi-transparent member 122 without covering the camera module 130. In this case, the window 152 may block a portion of external light incident to the semi-transparent member 122.

The electronic device 100 may include a connector module 194 that is able to communicate with an external electronic device, a speaker module 197 that is able to reproduce a sound signal, a microphone module 198 which is able to convert a voice signal of the user into an electrical signal, a touch pad module 192 which allows touch input by a user, and a proximity sensor 196 to measure a distance or a depth.

The connector module 194 and the touch pad module 192 may be disposed on a first side surface of the housing 110. The connector module 194 may include a universal serial bus (USB) module including a USB interface. The connector module 194 may be connected to the external electronic device through the USB module, and may transmit the touch input by the user to the external electronic device. The touch pad module 192 may receive the touch input by the user (e.g., direct touch input or hovering input).

Figure 4:
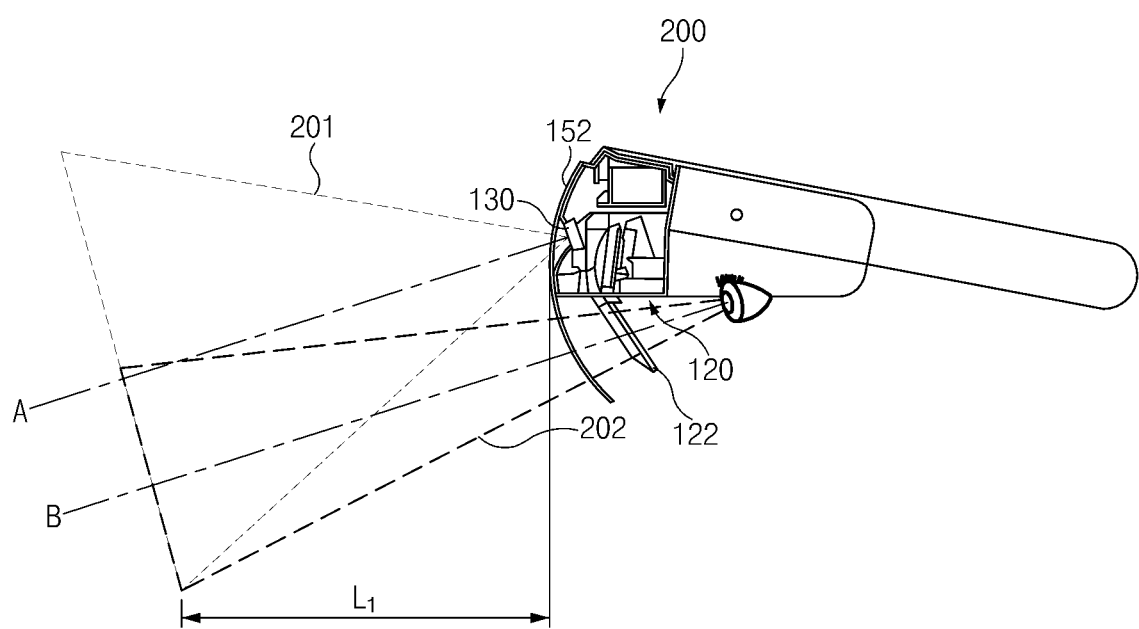
FIG. 4 is a view illustrating the field of view of a camera module of the electronic device and the field of view of a user, according to an embodiment.
Figure 5:
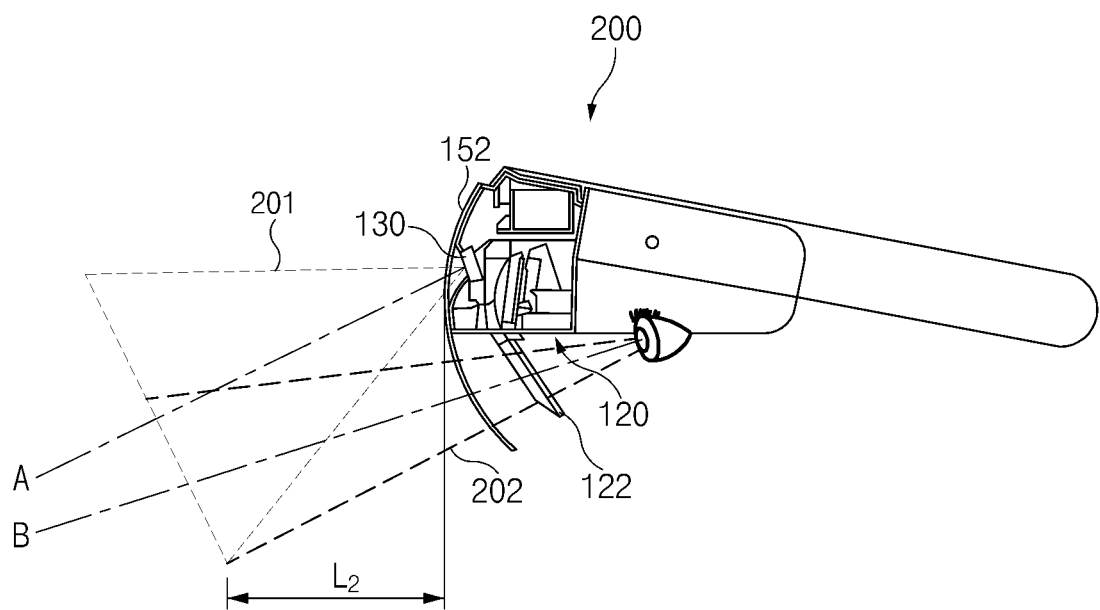
FIG. 5 is a view illustrating the field of view of the camera module of the electronic device and the field of view of the user, according to an embodiment.

FIG. 4 is a view illustrating the field of view of the camera module 130 of the electronic device 200 and the field of view of a user, according to an embodiment. FIG. 5 is a view illustrating the field of view of the camera module 130 of the electronic device 200 and the field of view of the user, according to an embodiment.

Referring to FIGS. 4 and 5, the field of view 201 of the camera module 130 of the electronic device 200 may include the field of view 202 of the user through the semi-transparent member 122.

The triangles drawn by dotted lines in the drawing are the field of view of each camera and the field of view 202 of the user, respectively, and straight lines A and B are centerlines of the field of view of the camera and the field of view 202 of the user.

The field of view of the user may face downward from the front direction. In this case, the field of view 201 of the camera module 130 may cover the field of view 202 of the user. The centerline of the field of view 202 of the user and the centerline of the field of view 201 of the camera module 130 may face downward from the front direction.

As illustrated in FIG. 4, the camera module 130 and the semi-transparent member 122 may be arranged such that the centerline of the field of view 202 of the user is parallel to the centerline of the field of view 201 of the camera module 130.

Alternatively, as illustrated in FIG. 5, the camera module 130 and the semi-transparent member 122 are arranged such that the centerline of the field of view 201 of the camera module 130 faces downward from the centerline of the field of view 202 of the user. The centerline of the field of view 201 of the camera module 130 and the centerline of the field of view 202 of the user may cross each other ahead.

The electronic device 200 may recognize an object positioned in the field of view 201 of the camera module 130, and may output, in the form of visual information, information on the recognized object through the light output member 124, and may provide the output visual information for a user through the semi-transparent member 122 via the light transmitting member 126 including at least one lens and/or mirror. In detail, the external light reflected from an object positioned in the field of view 201 of the camera module 130 may be incident to the camera module 130 through the opening 151 or the window 152 formed in the front cover 150.

The window 152 may be formed of a plastic material and may be manufactured to have a specified transmittance in a dual-injection molding manner.

Simultaneously, the user may view an object positioned forward through the semi-transparent member 122. The semi-transparent member 122 may include a semi-transparent lens. That is, the user may receive first visual information associated with the external environment ahead and second visual information associated with the first visual information. The first visual information may be transmitted to the eyeball through the semi-transparent lens and associated with an environment in front of the user, which is within the field of view of the user, and the second visual information may be view information output from the image output module 120. The second visual information may include additional visual information obtained by editing or processing the first visual information within the field of view, which is obtained by the camera module 130.

Therefore, it is preferred that the field of view 201 of the camera module 130 covers the field of view 202 of the user.

Accordingly, the electronic device 200 may recognize all objects positioned within the field of view 202 of the user and may visually provide additional information about the objects for the user.

Reference signs L1 and L2 illustrated in FIGS. 4 and 5 refer to the minimum distance at which the field of view 201 of the camera module 130 may cover the field of view 102 of the user according to the embodiments.

Figure 6:
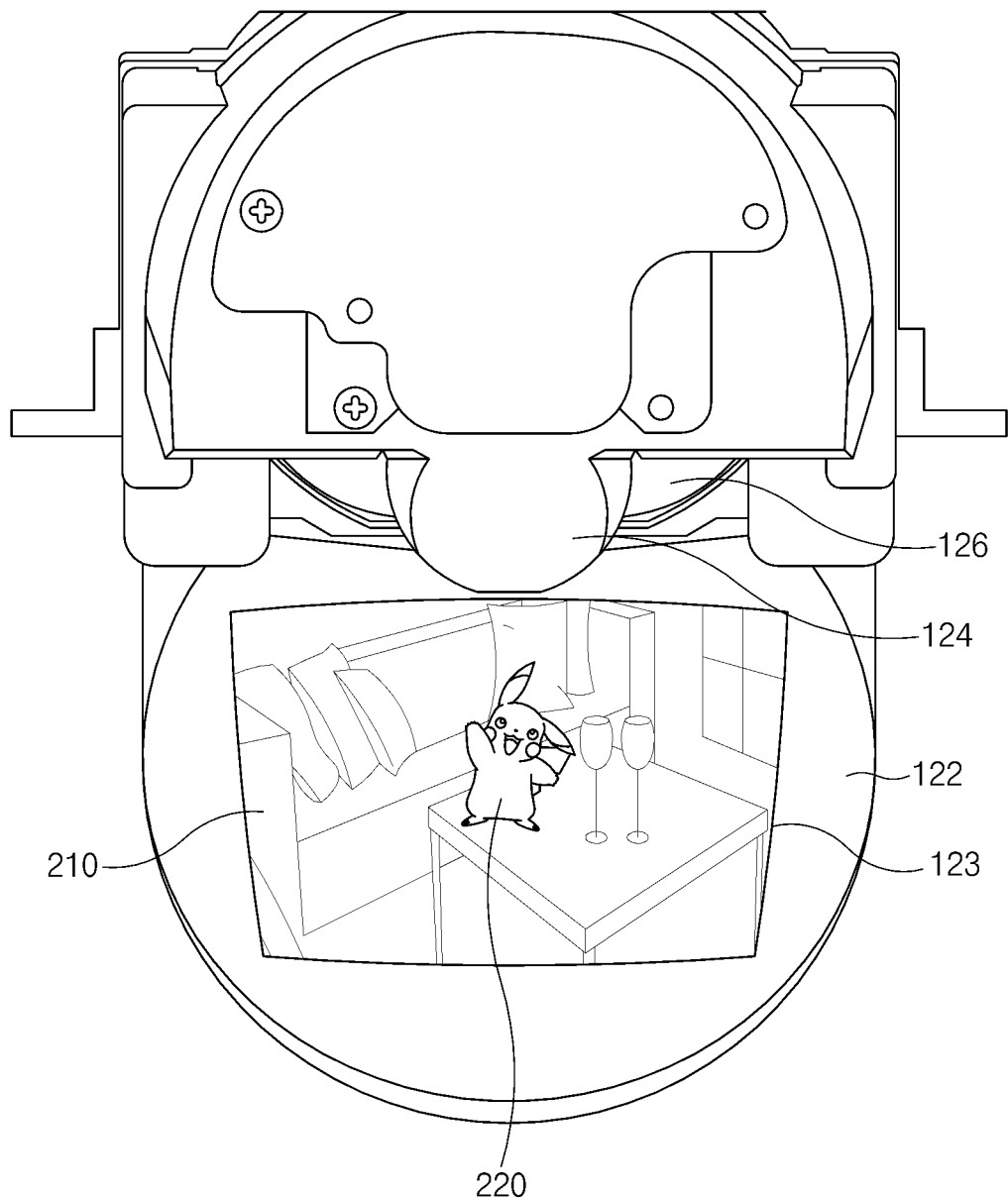
FIG. 6 is a view illustrating an image output module and a semi-transparent member of the electronic device, according to an embodiment.
Figure 7:
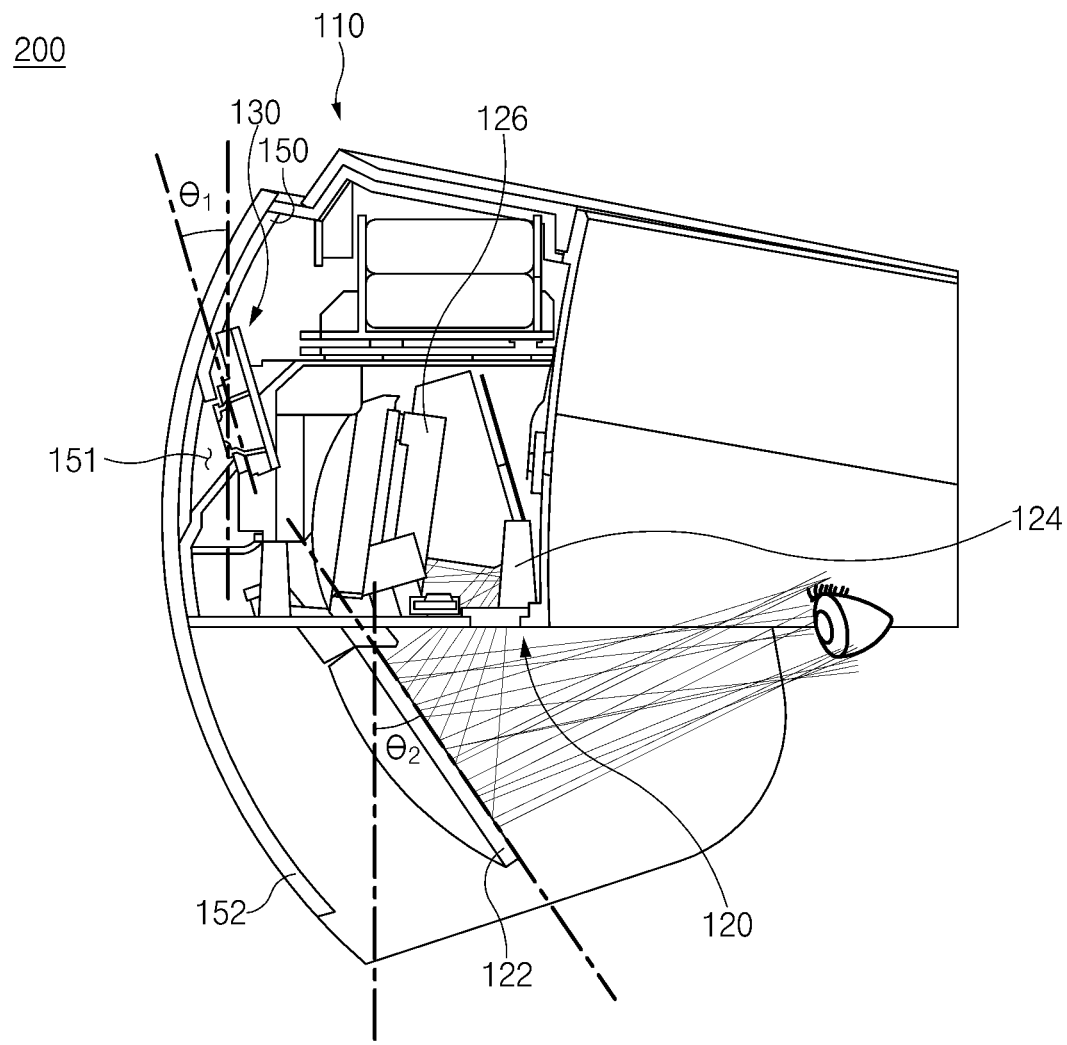
FIG. 7 is a view illustrating that the visual information output from the light output member is transmitted to the eyeballs of the user, according to an embodiment.

FIG. 6 illustrates the image output module 120 and the semi-transparent member 122 of the electronic device, according to an embodiment. FIG. 7 is a view illustrating transmitting visual information output from the light output member 124 to the eyeballs of the user, according to an embodiment.

Referring to FIGS. 6 and 7, the image output from the light output member 124 of the image output module 120 may be transmitted to the semi-transparent member 122. The image output module 120 may include the light transmitting member 126 that includes one or more lenses and/or mirrors. The one or more lenses and/or mirrors may optically connect the light output member 124 with the semi-transparent member 122.

The front surface of the semi-transparent member 122 may be formed to be in a convex shape. In addition, the rear surface 114 of the semi-transparent member 122, facing the eyeballs of the user, may be formed to be in a concave shape.

The semi-transparent member 122 may have semi-transparency and may include a semi-transparent lens. The light output member 124 may include a light generating device, such as a display device or a projector, which emits light. The second visual information 220 output from the light output member 124 is reflected by the semi-transparent member 122 and may be transmitted to the eyeballs of the user. In addition, the first visual information 210 transmitted through external light may be transmitted to the eyeballs of the user through the semi-transparent member 122.

An image area 123, in which the first visual information 210 and the second visual information 220, which are transmitted to the eyeball of the user, may be formed as illustrated in FIG. 6. Since the lower portion of the semi-transparent member 122 is disposed closer to the eyeball of the user than the upper portion of the semi-transparent member 122, the upper portion of the image area 123 may be formed to be wider than the lower portion of the image area 123.

Referring to FIG. 7, the camera module 130 is arranged to be inclined at a first angle with respect to a vertical line, and the upper and lower portions of the opening 151 formed in the front surface of the housing 110 or the front cover 150 may be asymmetrically formed. The lower portion of the opening 151 may be formed to be deeper than the upper portion of the opening 151, and the lower inner sidewall of the opening 151 may be formed in an inclined manner so as not to block the field of view of the camera module 130.

The semi-transparent member 122 may be arranged to be inclined at a second angle with respect to the vertical line. The second angle may be formed to be greater than the first angle.

Accordingly, the semi-transparent member 122 facing the eyeball of the user of the electronic device 100 is positioned under the eyeballs of the user such that the field of view of the user corresponds to the main field of view of a human being. More preferably, as illustrated in FIG. 7, the semi-transparent member 122 may be arranged to be inclined at a specified angle with respect to the line perpendicular to the front direction.

Figure 8:
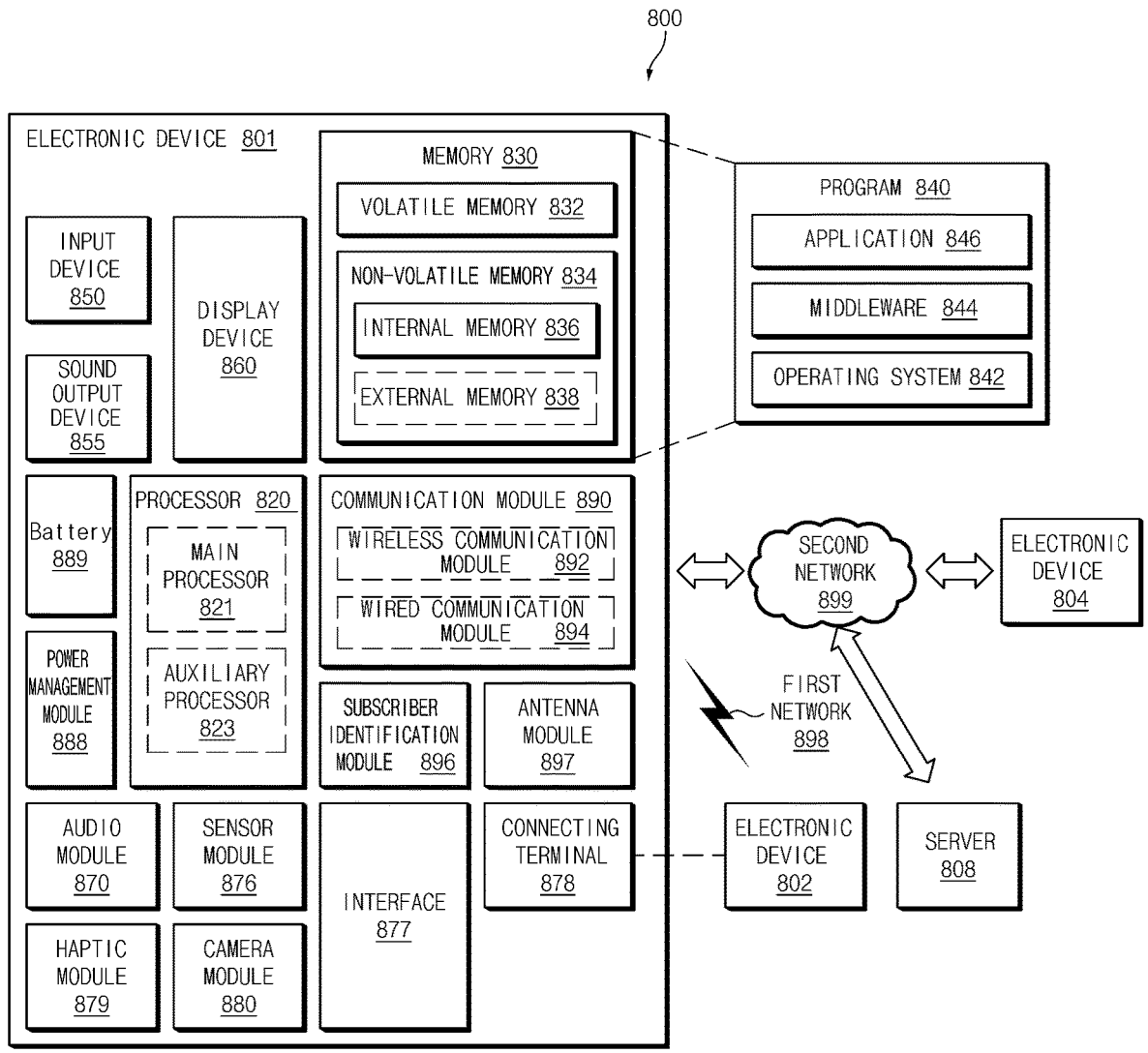
FIG. 8 is a block diagram illustrating an electronic device in a network environment, according to an embodiment.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specified to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, an aspect of the present disclosure is to provide an electronic device in which the weight felt by a user can be reduced when the user puts on the electronic device.

Another aspect of the present disclosure is to provide an electronic device, in which the field of view of a camera module of the electronic device can cover the whole field of view of a user.

Another aspect of the present disclosure is to provide an electronic device capable of allowing the field of view of a user to correspond to the main field of view of a human being.

As described above, when the user puts on the electronic device, the load of the electronic device can be concentrated on a partial area of the electronic device supported by a part of a user's body, so the weight felt by the user may be reduced.

As the field of view of the camera module covers the whole field of view of the user, all objects positioned within the field of view of the user can be recognized.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a housing including a first opening and a second opening;
a bracket disposed inside the housing;
a camera that obtains an image of an external object through the first opening and is disposed on a first surface of the bracket, wherein the camera module is disposed to be inclined at a first angle with respect to a line perpendicular to a front-surface direction of the electronic device;
an image output module that outputs an image to an outside through the second opening and is disposed on a second surface of the bracket;
a circuit board electrically connected with the camera and the image output module and disposed on a third surface of the bracket; and
a semi-transparent member disposed under the image output module, at a specified angle with respect to a direction of outputting the image such that the image is displayed for a user, wherein the semi-transparent member includes a semi-transparent lens that is disposed to be inclined at a second angle, which is greater than the first angle, with respect to the perpendicular line.

2. The electronic device of claim 1, wherein the semi-transparent lens is exposed to the outside through the second opening of the housing.

3. The electronic device of claim 1, wherein the camera is arranged at the first angle to have an optical axis parallel to an eyesight axis of the user or inclined toward the eyesight axis of the user.

4. The electronic device of claim 1, wherein a field of view of the camera includes a field of view of the user.

5. The electronic device of claim 1, wherein the second opening is positioned under the third surface of the bracket and the circuit board is provided on the third surface of the bracket, and wherein the electronic device further includes a battery positioned on the circuit board.

6. An electronic device, which s worn on the head of a user, the electronic device comprising:
a housing including an upper surface, a lower surface including an opening, and a rear surface, which is interposed between the upper surface and the lower surface facing the face of the user, and having a front portion which is open;
a wearing member extending from opposite sides of the rear surface of the housing to surround at least a portion of the head of the user;
a bracket including a first surface facing the open front portion of the housing, a second surface extending rearward from the first surface and facing the opening, and interposed between the upper surface and the lower surface;
a camera module disposed on the first surface of the bracket to face forward; and
an image output module having at least a portion inserted into the opening, and including a light output member, a semi-transparent lens facing an eyeball of a user, and a light transmitting member optically connecting the light output member with the semi-transparent lens and including at least one of a lens or a mirror,
wherein the camera module is disposed such that a first centerline of a field of view of a camera formed through the camera module is directed downward while facing a front-surface direction, and
wherein the camera module is disposed to be inclined at a first angle with respect to a line perpendicular to the front-surface direction, and the semi-transparent lens is disposed to be inclined at a second angle, which is greater than the first angle, with respect to the perpendicular line.

7. The electronic device of claim 6, wherein the semi-transparent lens is disposed such that a second centerline of a field of view of the user formed through the semi-transparent lens is directed downward while facing in the front-surface direction.

8. The electronic device of claim 7, wherein the first centerline and the second centerline are parallel to each other or cross each other at the front portion.

9. The electronic device of claim 7, wherein the field of view of the camera includes the field of view of the user.

10. The electronic device of claim 7, wherein the field of view of the user is directed downward while facing the front-surface direction such that the field of view of the user corresponds to a main field of view of a human being.

11. The electronic device of claim 6, further comprising:
a substrate disposed on the second surface of the bracket.

12. The electronic device of claim 11, wherein the substrate includes:
a first substrate disposed on the second surface and a second substrate disposed on the first substrate, and
wherein the electronic device includes a battery disposed on the second substrate and interposed between the second substrate and the upper surface.

13. The electronic device of claim 6, wherein the semi-transparent lens is a concave lens concavely recessed in a first surface facing an eyeball of the user.

14. The electronic device of claim 6, wherein the semi-transparent lens has an image area, and
wherein the image area includes an image formed by light reflected from the semi-transparent lens or light transmitted through the semi-transparent lens.

15. The electronic device of claim 12, wherein the battery is disposed at a position corresponding to the forehead of the user when the user puts on the electronic device.

16. An electronic device comprising:
a housing including a head mounting unit;
a camera included inside the housing and arranged to have a first field of view in a first optical axis direction, wherein the camera is disposed to be inclined at a first angle with respect to a line perpendicular to a front-surface direction of the electronic device;
a lens positioned outside the housing and inclined at a second angle within a specified range with respect to the perpendicular line, which is greater than the first angle; and
a light output device included inside the housing to output light to at least a portion of the lens.

17. The electronic device of claim 16, wherein the first optical axis direction is parallel to a central field of view of a user or is more inclined downward.

18. The electronic device of claim 16, wherein the first field of view of the camera includes a field of view of the user.

19. The electronic device of claim 16, wherein the housing includes a first area which is formed under the first optical axis direction and is adjacent to the camera and a second area formed above the first area, and
wherein the first area has a length longer than a length of the second area.

* * * * *